(12) United States Patent
Sawaya

(10) Patent No.: US 8,277,648 B2
(45) Date of Patent: Oct. 2, 2012

(54) REMEDIATION SYSTEM FOR TRANSITION METAL IONS AND METHOD FOR SAME

(75) Inventor: Frederick J. Sawaya, Farmington Hills, MI (US)

(73) Assignee: Safe Mines and Waterways, LLC, Farmington Hills, MI (US)

( * ) Notice: Subject to any disclaimer, the term of this patent is extended or adjusted under 35 U.S.C. 154(b) by 0 days.

(21) Appl. No.: 13/105,248

(22) Filed: May 11, 2011

(65) Prior Publication Data

US 2011/0210071 A1    Sep. 1, 2011

Related U.S. Application Data

(60) Provisional application No. 61/396,233, filed on May 24, 2010.

(51) Int. Cl.
*C02F 1/48* (2006.01)
*C02F 1/62* (2006.01)

(52) U.S. Cl. ........... 210/188; 210/198.1; 210/206; 210/222; 210/223; 210/695; 210/705; 210/718; 210/724; 210/912

(58) Field of Classification Search .......... 210/188, 210/198.1, 206, 222, 263, 695, 705, 718, 210/724, 912, 223
See application file for complete search history.

(56) References Cited

U.S. PATENT DOCUMENTS

| | | | |
|---|---|---|---|
| 3,762,771 A | 10/1973 | Livingston | |
| 4,116,705 A | 9/1978 | Chappell | |
| 4,422,943 A * | 12/1983 | Fender et al. | 210/724 |
| 5,223,023 A | 6/1993 | Awadalla et al. | |
| 5,449,460 A | 9/1995 | Buisman | |
| 5,720,875 A | 2/1998 | Stegall et al. | |
| 6,630,071 B1 * | 10/2003 | Buisman et al. | 210/912 |
| 6,896,808 B1 | 5/2005 | Jay | |

(Continued)

FOREIGN PATENT DOCUMENTS

WO    9729055 A1    8/1997

OTHER PUBLICATIONS

Ray, Asim B., et al., Laboratory Studies on the Remediation of Mercury Contaminated Soils, Remediation Journal: The Journal of Environmental Cleanup Costs, Technologies, and Techniques, vol. 10, Issue 4, Jan. 11, 2007, pp. 49-56.

(Continued)

*Primary Examiner* — David A Reifsnyder
(74) *Attorney, Agent, or Firm* — Brooks Kushman P.C.

(57) ABSTRACT

In at least one embodiment, a remediation system for oxic water having transition metal ions includes a first chamber defining a first cavity having a first inlet and a first outlet. The first cavity includes oxic water having dissolved ions of reduced species of chalcogenides. The system also includes a second chamber in fluid communication with the first chamber. The oxic water has a pH ranging from 2.5 to 7.5 when present in the first chamber.

20 Claims, 6 Drawing Sheets

U.S. PATENT DOCUMENTS

| | | |
|---|---|---|
| 6,896,815 B2 * | 5/2005 | Cort .......................... 210/695 |
| 7,029,202 B2 | 4/2006 | Zhuang |
| 7,264,733 B2 * | 9/2007 | Matsunami et al. .......... 210/724 |
| 7,419,605 B2 | 9/2008 | Zhuang |
| 7,588,686 B2 | 9/2009 | Jensen |
| 7,666,318 B1 | 2/2010 | Lehtinen et al. |
| 2005/0040108 A1 | 2/2005 | Jay |
| 2007/0209989 A1 * | 9/2007 | Hayashi et al. .............. 210/222 |
| 2009/0277303 A1 | 11/2009 | Wallace et al. |
| 2010/0180728 A1 | 7/2010 | Welham et al. |
| 2010/0193422 A1 | 8/2010 | Sawaya et al. |

OTHER PUBLICATIONS

Takaoka, M. Removal of Mercury in Flue Gas by the Reaction With Sulfide Compounds, Toxicological & Environmental Chemistry, 73, 1999, pp. 1-16.

Zhang, Jian, et al., Enhancement of Mercury Adsorption Capacity of Reactivated PAC by Sulfurization, Symposia Papers, Division of Environmental Chemistry, American Chemical Society, Orlando, Florida, vol. 42, No. 1, pp. 889-891.

* cited by examiner

US 8,277,648 B2

REMEDIATION SYSTEM FOR TRANSITION METAL IONS AND METHOD FOR SAME

CROSS-REFERENCE TO RELATED APPLICATIONS

This application claims the benefit of U.S. provisional Application No. 61/396,233 filed May 24, 2010, the disclosure of which is incorporated in its entirety by reference herein.

TECHNICAL FIELD

At least one embodiment relates to a remediation system for transition metal ions and a method for same.

BACKGROUND

Transition metal ions that are readily solubilized in the environment are known on occasion to have deleterious impacts. Immobilizing the transition metals before they reach locations or facilities that are sensitive to their presence is an important remediation strategy. It would be advantageous in terms of development costs and speed of deployment, if similar immobilization methods and systems would be able to remediate environments already experiencing contamination.

Once contaminants are collected, it is advantageous to reclaim the contaminants into commercially viable metal sources.

SUMMARY

In at least one embodiment, a remediation system for oxic water having transition metal ions includes a first chamber defining a first cavity having a first inlet and a first outlet. The first cavity includes oxic water having dissolved ions of reduced species of chalcogenides. The system also includes a second chamber in fluid communication with the first chamber. The oxic water has a pH ranging from 2.5 to 7.5 when present in the first chamber.

In another embodiment, a remediation system for oxic water having transition metal ions includes a pH adjustment system and a precipitation system fluidly communicating with the pH adjustment system. The precipitation system has soluble thiosulfate ions at useful pH. An immobilizer system is situated downstream of the precipitation system and spaced apart from the pH adjustment system. The immobilizer system including a removable collection medium when collecting transition metal-sulfide containing precipitates generated in the precipitation system.

In yet another embodiment, a method for remediating oxic water having transition metal ions includes the steps of providing oxic water having transition metal ions. The transition metal ions are introduced to a first chamber defining a first cavity having a first inlet and a first outlet. The pH of the oxic water is adjusted to a pH ranging from 2.5 to 7.5 forming a pH-adjusted oxic water. Ions of reduced species of chalcogenides are introduced to the pH-adjusted oxic water urging a reaction between the reduced species of chalcogenides and the transition metal ions to form insoluble transition metal-chalcogenide species complexes. The insoluble transition metal-chalcogenide species complexes are immobilized forming remediated oxic water. The remediated oxic water is released.

DETAILED DESCRIPTION

Reference will now be made in detail to presently preferred compositions, embodiments and methods of the present invention, which constitute the best modes of practicing the invention presently known to the inventors. The figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any claims and/or as a representative basis for teaching one skilled in the art to variously employ the present invention.

Except in examples, or where otherwise expressly indicated, all numerical quantities in this description used to indicate amounts of material or dimensions are to be understood as modified by the word "about" in describing the broadest scope of the invention. Practice within the numerical limits stated is generally preferred. Also, unless expressly stated to the contrary: the description of a group or class of materials as suitable or preferred for a given purpose in connection with the invention implies that mixtures of any two or more the members of the group or class are equally suitable for preferred; the first definition of an acronym or other abbreviation applies to all subsequent uses herein of the same abbreviation and applies mutatis mutandis to normal grammatical variations of the initially defined abbreviation; and, unless expressly stated to the contrary measurement of a property is determined by the same technique as previously or later referenced for the same property. Also, unless expressly stated to the contrary, percentage, "parts of," and ratio values are by weight, and the term "polymer" includes "oligomer," "copolymer," "terpolymer," "pre-polymer," and the like.

Turning now to FIGS. 1 and 2A-2C, an embodiment of a remediation system is schematically illustrated and shown in cross-sectional views. At an operation exposed to rain and/or groundwater, such as a landfill or a mining operation 200, including a coal mine or a gold mine, an effluent 202, such as acidic mine drainage which contain transition-metal ions, often referred to as heavy metals, may be directed to a predetermined collection chamber 204. Collection chamber 204 in at least one embodiment, is a groove of an approximate V- or U-shape produced by construction machinery, such as a grading blade or a back hoe, cutting ground 208.

Figure 1:
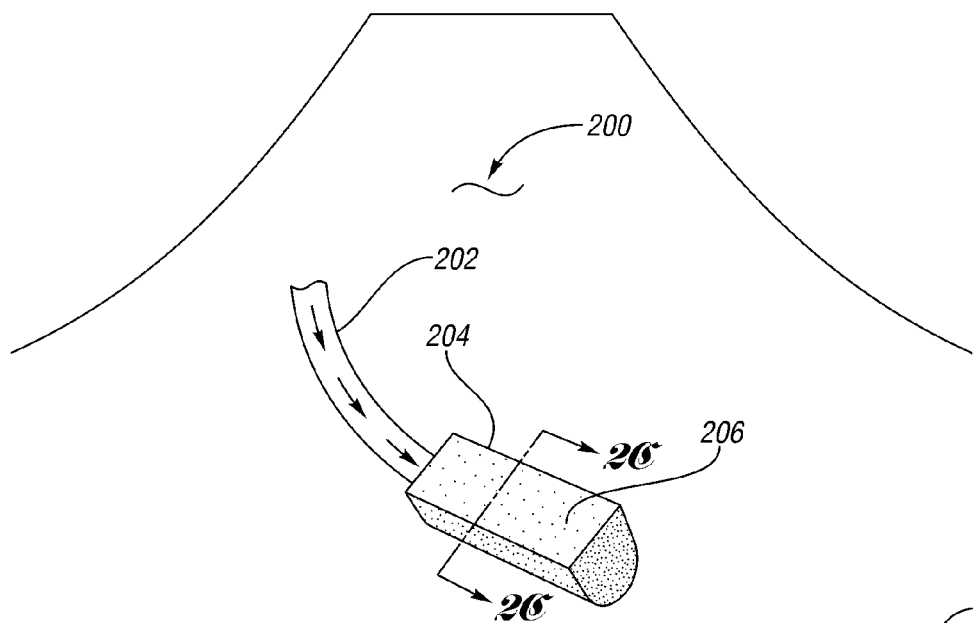
FIG. 1 schematically illustrates a remediation system for transition metals according to at least one embodiment.
Figure 2A:
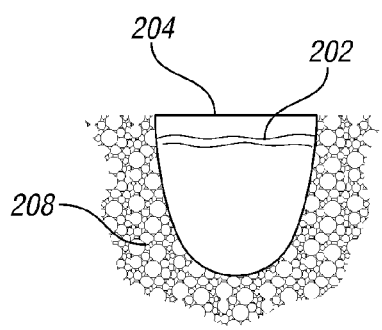
FIGS. 2A-2C schematically illustrate a method for remediation along axis 2C-2C of FIG. 1 according to at least one embodiment.
Figure 2B:
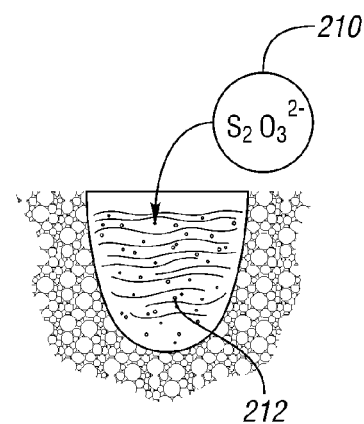
Figure 2C:
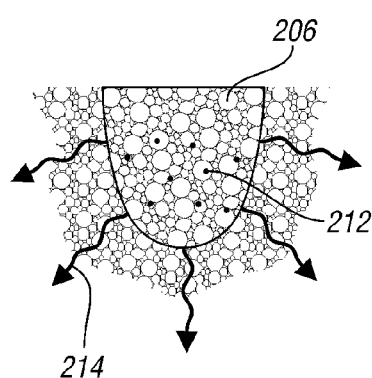

In FIG. 2A, effluent 202 collects in chamber 204. In FIG. 2B, a thiosulfate-containing material 210, such as sodium thiosulfate, is added to the effluent 202 forming a precipitate 212. Precipitate 212 is immobilized in FIG. 2C using a sand and gravel fill 206 to capture the precipitate 212 while remediated water 214 flows into the ground 208 and/or elsewhere including into the environment or additional processing operations. The sand and gravel fill 206 in certain embodiments is reclaimed to allow recycling of the heavy metals.

Figure 3:
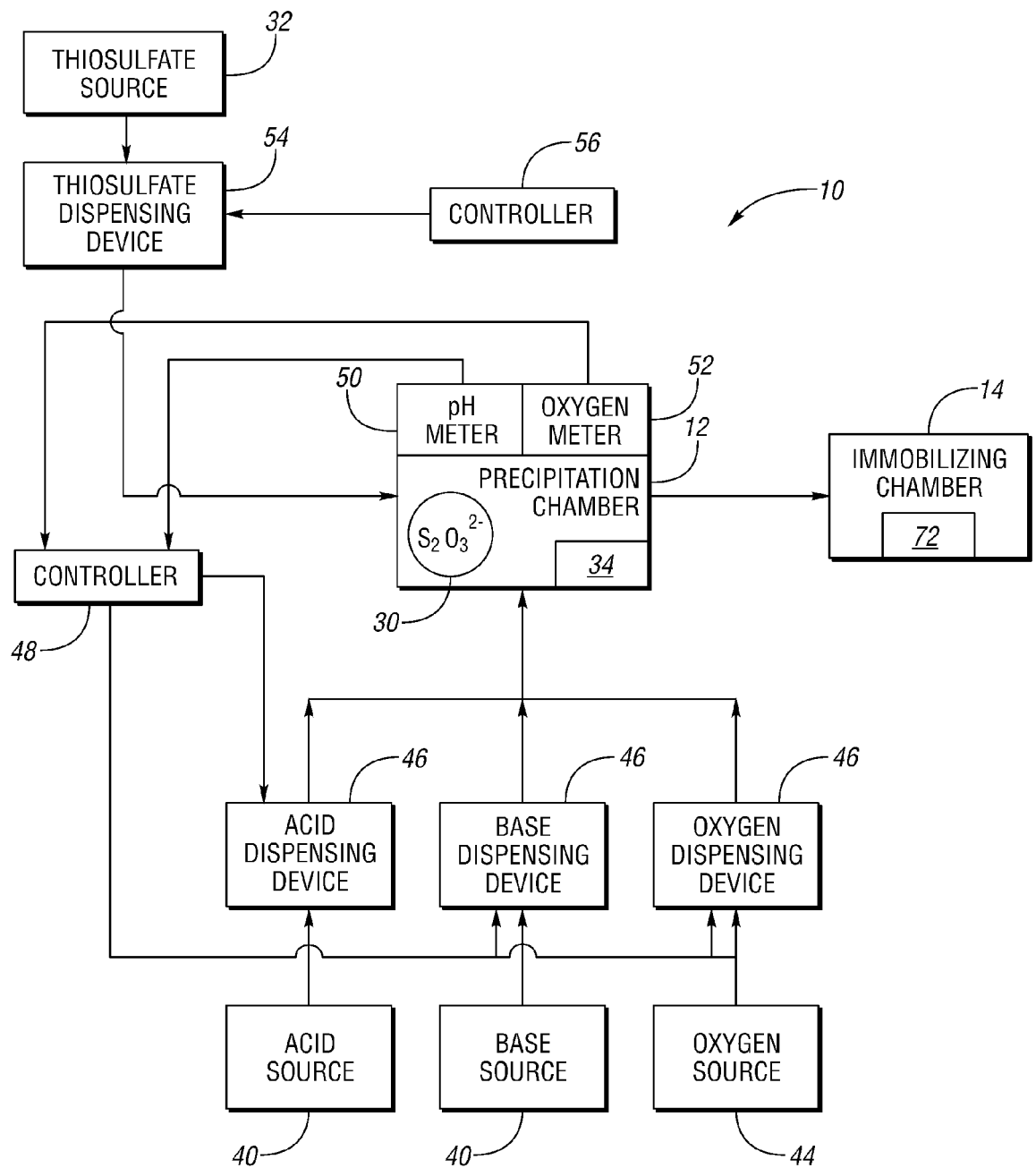
FIG. 3 schematically illustrates a remediation system for transition metal ions according to at least one embodiment.
Figure 4:
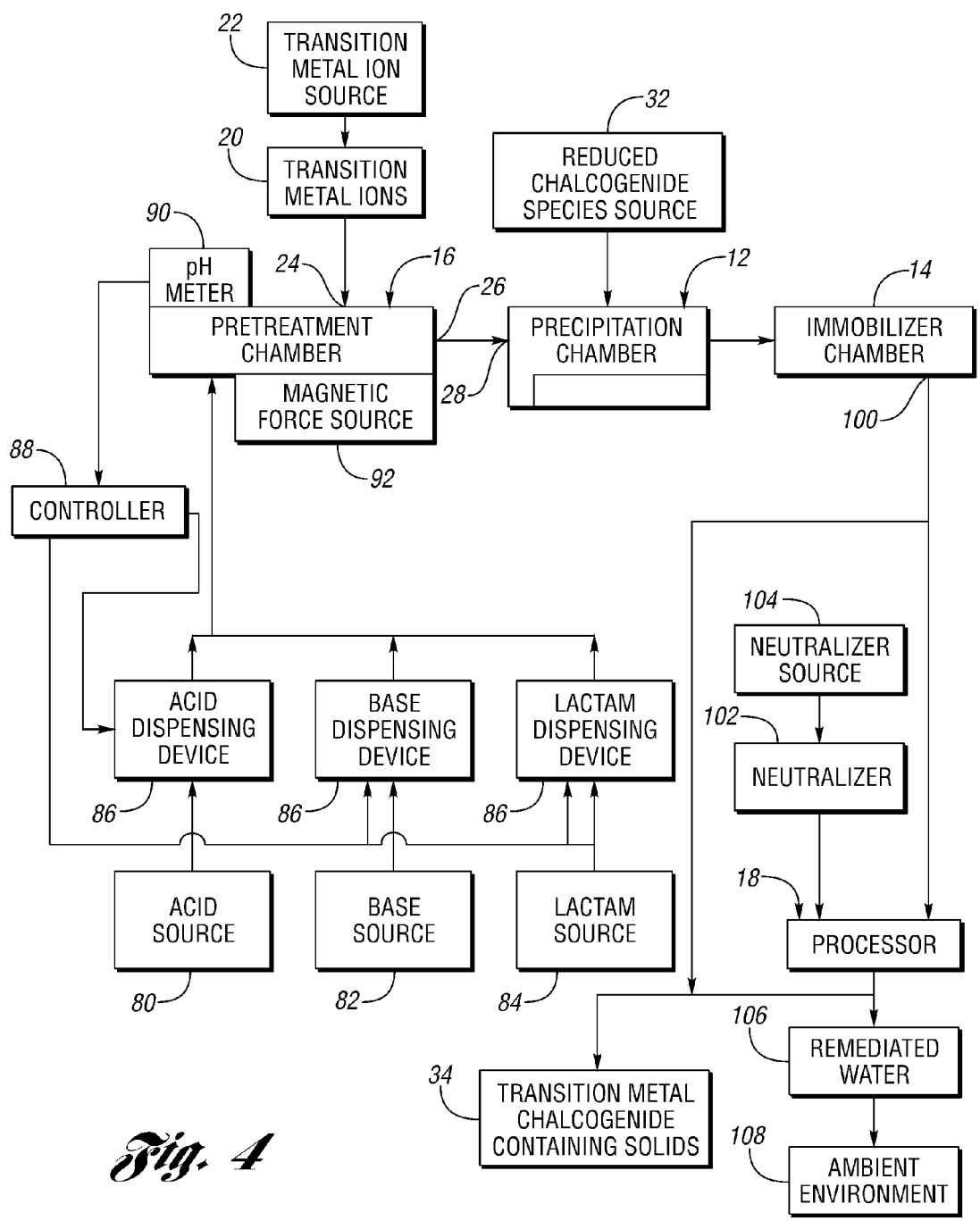
FIG. 4 schematically illustrates a remediation system for transition metal ions according to another embodiment.

Turning now to FIGS. 3 and 4, embodiments of a remediation system 10 are schematically illustrated. Remediation system 10 includes a precipitation chamber 12, and immobilizing chamber 14 downstream of and fluidly communicating with precipitation chamber 12. An optional pretreatment chamber 16 is schematically illustrated as situated upstream of and fluidly communicating with precipitation chamber 12. An optional processor 18 is schematically illustrated as situated downstream of and fluidly communicating with immobilizing chamber 14.

In at least one embodiment, transition metal ions 20 in an effluent from a transition metal ion source 22 enter in optional pretreatment chamber 16 through inlet 24. Transition metal ions 20 exit pretreatment chamber 16 through outlet 26 and enter precipitation chamber 12 through inlet 28. It is understood that transition metal ions 20, in certain embodiments, may enter precipitation chamber 12 directly from transition metal ion source 22. Thiosulfate ions 30 are provided to precipitation chamber 12 from thiosulfate ion source 32. Transition metal ions 20 in the effluent react with thiosulfate ions 30 and/or other reduced species of chalcogenide ions yielding transition metal-chalcogenide-containing solids 34.

It should be understood, transition metal ions 20 may include, but are not limited to, metal ions of groups 3-12 as well as metal portions of groups 13-15; hydrated transition metal ions; complexed transition metal ions, such as transition metal ion-fulvic and/or humic complexes, as well as alkylated transition metal ions, such as methyl mercury; and sorbed metal ions, such as metal ions on clay substrates. Further, it should be understood that lanthanide and actinide metal ions are considered transition metal ions 20 in certain embodiments.

In at least one embodiment, precipitation chamber 12 optionally includes an acid source 40, a base source 42, and/or an oxygen source 44. Acid source 40, base source 42, and/or oxygen source 44 are connected to precipitation chamber 12 in certain embodiments, through one or more dispensing devices, such as metering devices 46, including a valve or a flow meter, controlled by a controller 48. Controller 48 receives a signal from a pH meter 50 and/or an oxygen sensor 52. Controller 48 adapts the signal to adjust the pH and dissolved oxygen content (DOC) of the transition metal effluent into a predetermined range and to maintain the effluent in a predetermined range.

In at least one embodiment, controller 48 is adapted to provide output signals to the dispensing device, such as metering device 46, so that the pH of precipitation chamber 12 is adjusted to the pH range from 2.5 to 7.5. In another embodiment, the pH of precipitation chamber 12 is adjusted to the pH range from 4 to 7. In yet another embodiment, the pH of precipitation chamber 12 is adjusted to the pH range from 4.5 to 6.5.

In at least one embodiment, controller 48 is adapted to provide output signals to metering device 46 such that the water of precipitation chamber 12 is adjusted to oxic conditions. In another embodiment, the DOC of precipitation chamber 12 is adjusted to a DOC range from 1 mg $O_2$/L to 8.6 mg $O_2$/L at 25° C. when measured according to ASTM D-888.

In at least one embodiment, the release of thiosulfate ions 30 from thiosulfate ion source 32 is controlled by a metering device 54 which is controlled by a controller 56.

It should be understood that thiosulfate ions 30 are disclosed as being present in the thiosulfate ion source 32. Other reduced chalcogenide species are included with the thiosulfate ions 30 in certain embodiments. Non-limiting examples of reduced chalcogenide ions include thiosulfate ions ($S_2O_3^{2-}$); bithiosulfate ions ($HS_2O_3^{1-}$); thiosulfuric acid ($H_2S_2O_3$); tetrathionate ions ($S_4O_6^{2-}$); dithionite ions ($S_2O_4^{2-}$); sulfur-containing oxoanions, such as sulfate ions; and sulfide ions, including but not limited to polysulfide ions and polysulfido-complexes.

It should also be understood that chalcogenides include sulfur, selenium, and tellurium atoms.

In at least one embodiment, soluble chalcogenide species include thiosulfate ions in an amount ranging from $1\times10^{-6}$ g S/L to 40 g S/L dissolved in water in precipitation chamber 12. In another embodiment, the thiosulfate ions are present in an amount ranging from $1\times10^{-5}$ g S/L to 10 g S/L dissolved in water in precipitation chamber 12.

In at least one embodiment, immobilizing chamber 14 receives fluid and transition metal-chalcogenide-containing solids 34 through inlet 70 which is in fluid communication with precipitation chamber outlet 58. In at least one embodiment, immobilizing chamber 14 includes a removable collection medium 72. Non-limiting examples of removable collection media 72 include a sand and gravel filter, a sand filter, a polymeric medium filter, and a medium capable of collecting metal ion-chalcogenide-containing solids 34.

It is understood that transition metal-chalcogenide-containing solids 34 may have different forms. Non-limiting examples of different forms include insoluble particles; sorbed particles, such as on clays and organic debris; emulsions; and suspensions.

In at least one embodiment, the metal-chalcogenide-containing solids 34 have a number average particle size ranging from 0.1 μm to 500 μm. In another embodiment, solids 34 have a number average particle size ranging from 2 μm to 400 μm.

Removable collection medium 72, in at least one embodiment, is removed from immobilizing chamber 14 and is sent to a reclamation center (not shown) for the useful purpose of reclaiming transition metals from the transition metal-chalcogenide-containing solids 34. In certain embodiments, removable collection medium 72 and/or the transition metals may be segregated for more permanent disposal.

Schematically illustrated in FIG. 4, in another embodiment, pretreatment chamber 16 is situated upstream of precipitation chamber 12. Outflow of effluent from pretreatment chamber 16 passes through outlet 26 into inlet 28 of precipitation chamber 12. In at least one embodiment, pretreatment chamber 16 optionally includes an acid source 80, a base source 82, and/or a lactam source 84. Acid source 80, base source 82, and/or lactam source 84 are connected to pretreatment chamber 16 through one or more dispensing devices, such as metering devices 86 controlled by a controller 88. Controller 88 receives, at least, a signal from a pH meter 90.

In at least one embodiment, controller 88 is adapted to provide output signals to the dispensing device, such as metering device 86 such that the pH of pretreatment chamber 16 is adjusted to a pH range from 2.5 to 7.5. In another embodiment, pretreatment chamber 16 is 4.5 to 6.5.

In at least one embodiment, lactam source 84 is a source for a lactam polymer. Non-limiting examples lactam polymers include polymers of n-vinylpyrrolidone, poly[1-(2-oxo-1-pyrrolidinyl) alkylen], 1-ethenyl-2-pyrrolidon homopolymer, copolymers including 1-ethenyl-2-pyrrolidon, polyvinylpolypyrrolidone (PVPP), and polyvinylpyrrolidone (PVP). It should be understood that the lactam polymer may be a monomeric form, a cross-linked form, or a micronized form without exceeding the scope or spirit of the embodiments. While not wishing to be bound by any particular theory, lactam polymers usefully segregate transition metal ions 20, possibly by bonding with, complexing with, and/or sorbing the transition metal ions 20 as well as destroying bacterial species that may accompany or associate with transition metal ions 20.

In at least one embodiment, the lactam polymer is present in the amount ranging from 0.1 wt. % to 5 wt. % of material in the precipitation chamber 12. In another embodiment, the lactam polymer is present in the amount ranging from 0.5 wt. % to 3 wt. % of material in precipitation chamber 12. In another embodiment, the lactam polymer is PVP and is present in the amount ranging from 0.1 wt. % to 25 wt. % of thiosulfate ions in the precipitation chamber 12.

In at least one embodiment, pretreatment chamber 16 includes a magnetic force source 92. Magnetic force source 92 is useful in segregating a magnetic portion of transition metal ions 20 from the fluid in the pretreatment chamber 16. Segregated magnetic transition metal ions may be selectively directed to the precipitation chamber 12 during specific steps of the processing of the effluent having transition metal ions 20.

In another embodiment, fluid exiting immobilizing chamber 14 through outlet 100 is directed to processor 18. The fluid in processor 18, may have residual sulfur dioxide and/or hydrogen sulfide gas entrained in the fluid. Processor 18 is intended to remediate these gases from the fluid forming a remediated fluid. A neutralizing solution 102 from neutralizing solution source 104 reacts with entrained gases to remediate them. A non-limiting example of neutralizing solution 102 includes a basic calcium carbonate solution.

Remediated fluid, such as remediated water, may be separated from any residual solids in the processor 18, and then disposed properly into the ambient environment. Residual solids may be directed from processor 18 to a collection of transition metal-chalcogenide-containing solids 34. It should be understood that these transition metal-chalcogenide-containing solids 34 may be, in certain embodiments, situated in the removable collection medium 72 or immobilized in a containment condition.

Figure 5:
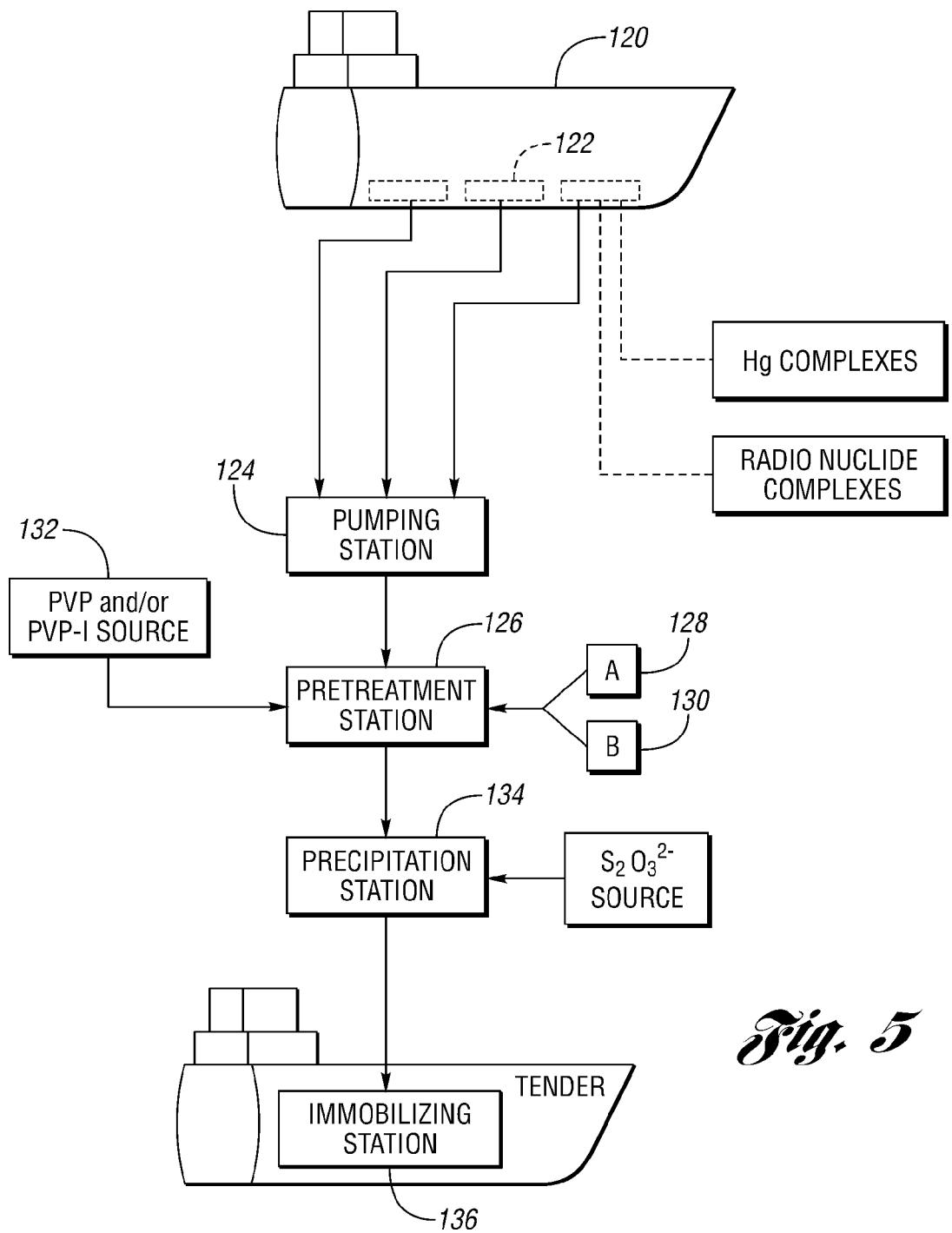
FIG. 5 schematically illustrates a remediation system for transition metal ions according to another embodiment.

Turning now to FIG. 5, a remediation system for metal ions emanating from ballast tanks 122 of a ship 120 is schematically illustrated. Water from ballast tanks 122 of an oceangoing ship 120 may contain hazardous materials such as mercury ion complexes and radionuclide complexes. In at least one embodiment, water from ballast tanks 122 is transferred through a pumping station 124 to a pretreatment station 126. At pretreatment station 126, the pH of the water is adjusted into the desired treatment range, as is needed, using an acid 128 or a base 130. As an option, bacteria and other microorganisms which may bind metals, can be sterilized in the pretreatment station 126 using PVP, including PVP-Iodine, through an introduction part into pretreatment station 126 from a source of PVP 132. In general, pretreatment may not be necessary with water emanating from ballast tanks 122 because the water is generally within the useful pH range and is oxic.

In another embodiment, water emanating from ballast tanks 122 or the pretreatment station 126 is transferred to the precipitation station 134. A source of thiosulfate ions and/or other reduced chalcogenide species provides reducing species to form insoluble precipitates of the transition metal ions in the ballast tank 122 water. The insoluble precipitates are then directed to an immobilizing station 136.

For convenience to oceangoing ships 120, pumping station 124, pretreatment station 126, precipitation station 134 and immobilizing station 136 may be positioned in one or more vessels, including buoys, situated offshore, in at least one embodiment. In another embodiment, one or more stations of pumping station 124, pretreatment station 126, precipitation station 134 and immobilizing station 136 may be positioned onshore with piping (not shown) connected to an offshore platform.

Figure 6:
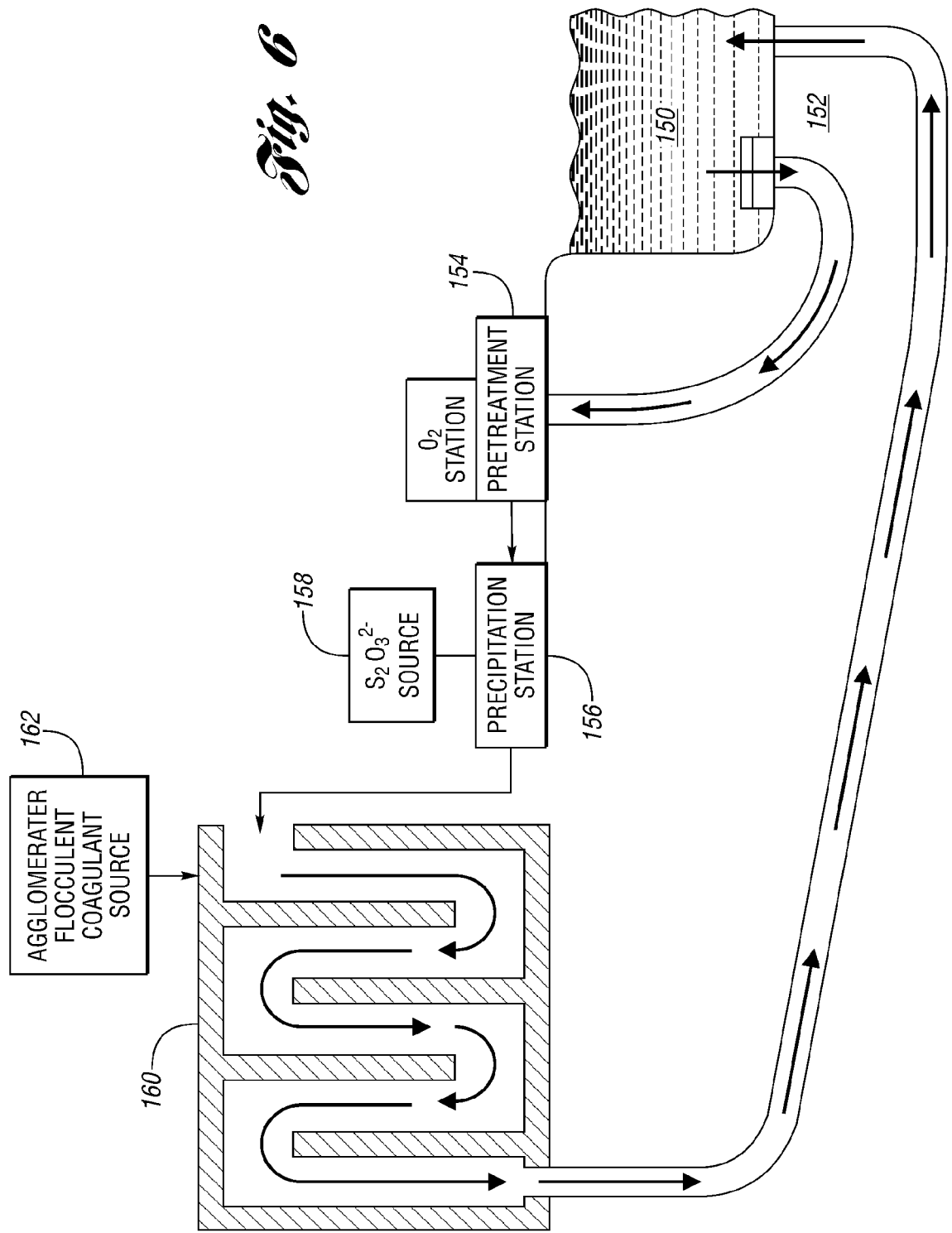
FIG. 6 schematically illustrates a remediation system for transition metal ions according to another embodiment.

Turning now to FIG. 6, in another embodiment, a remediation system is schematically illustrated for remediating natural waters such as coastal waters, Everglades-type rivers, rivers, estuarine waters, and lake water 150, which may include entrained or bedded lake sediment 152. In general, lake water 150 will have the pH within the useful range and be oxic. In certain lake waters, toxic metal complexes, such as methyl mercury, are present. Remediation of lake water 150 according to certain embodiments may be useful in eliminating hazardous chemical species through installation of a plurality of remediation stations along the shoreline of the lake. It would be advantageous for such remediation stations to be compact and use limited amounts of materials and energy.

In general, lake water 150 will have relatively low amounts of transition metal ions when compared to other sources that have allowed concentration of transition metal ions, such as in mine wastes and ballast tanks 122. In at least one embodiment, water will have an amount of transition metal ions ranging from $1\times10^{-9}$ g/L to $1\times10^{-2}$ g/L. In another embodiment, water will have an amount of transition metal ions ranging from $1\times10^{-8}$ g/L to $1\times10^{-3}$ g/L.

In at least one embodiment, material to be remediated is drawn from the water column into a pretreatment station 154 where oxygen is provided as needed. The water is provided to a precipitation station 156 into which a reduced chalcogenide ion mixture is introduced from a reduced chalcogenide ion source 158. The transition metal ions 20 react with the reduced chalcogenide ion mixture to form transition metal-chalcogenide solids. While not wanting to be limited by any one theory, it may be expected that the transition metal content is relatively low when compared to other sources such as mine wastes. As a consequence, in certain embodiments, the trace metal ion-chalcogenide solids will be relatively fine in size and dispersed widely in the water. Transferring the water containing the metal ion-chalcogenide solids into an immobilizing station 160, conventional devices and materials for consolidating the transition metal ion-chalcogenide solids into a precipitated solid mass may be used. Non-limiting examples of conventional materials for consolidating include a flocculent, a coagulant, and an agglomerating material. These consolidating materials are provided to the immobilizing station 160 from a source 162 situated near the entry to the immobilizing station. In at least one embodiment, the water with the consolidated transition metal-chalcogenide solids is processed in relatively laminar flow with a Reynolds number less than 2000 in the immobilizer such that the transition metal-chalcogenide solids are extracted from the water and made available for reclamation. The water is then returned to the lake environment.

Figure 7:
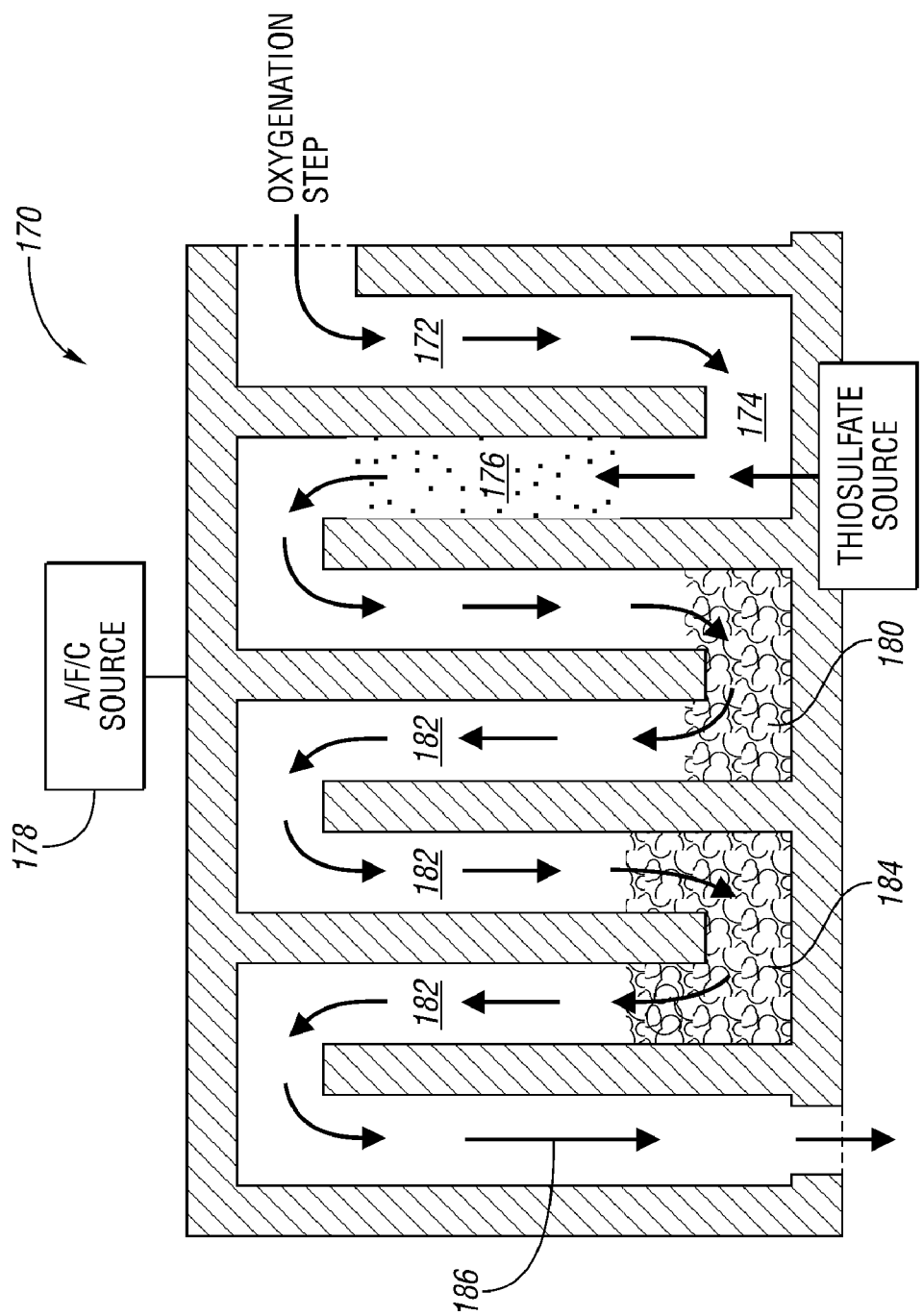
FIG. 7 schematically illustrates a remediation system for transition metal ions according to yet another embodiment.

Turning now to FIG. 7, a low cost and unified system for processing water having relatively low amounts of transition metal ions when compared to mine wastes is schematically illustrated. In at least one embodiment, the oxygenation step of the pretreatment station occurs when the water is allowed to flow through air into the unified chamber 170 wherein the pretreatment oxygenation step occurs in zone 172. In zone 174, thiosulfate ions are introduced to react with the transition metal ions to form the transition metal ion-sulfur-containing solids 176. Since the thiosulfate-metal ion reaction is, in general, controlled by kinetics, the water column, in certain embodiments, may be devised to provide adequate residence time within unified chamber 170 for the solids 176 to form. The agglomerating material, flocculent, and/or coagulant may be provided from a source 178 urging combination with the transition metal ion-sulfur-containing solids 176 to form a consolidated solid 180 in a portion of the immobilizing zone 182. Additional filtering may be accomplished with a sand and gravel filter 184 disposed downstream of the consolidated solid 180 and located within the immobilizing zone 182. Remediated water 186 emerges from the sand and gravel filter 184 and may be directed to exit the unitary chamber 170.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A remediation system for use with an oxic water having transition metal ions, the system comprising:
    a first chamber defining a first cavity having a first inlet and a first outlet, the first cavity including the oxic water having dissolved ions of reduced species of chalcogenides, including thiosulfate ions present in an amount ranging from $1\times10^{-6}$ g S/L to $40\times10^{-6}$ g S/L and a transition metal-thiosulfate complex in a solid form; and
    a second chamber including a filter having the oxic water forming an oxic filter, the chamber being in fluid communication with the first chamber, wherein the oxic water has a pH ranging from 2.5 to 7.5 when present in the first chamber.

2. The system of claim 1, further comprising:
    a third chamber situated downstream of and in fluid communication with the second chamber, the third chamber including a neutralizing solution, the neutralizing solution having a basic pH.

3. The system of claim 1, further comprising: a pretreatment system situated upstream of and fluidly communicating with the first inlet, the pretreatment system being capable of adjusting the pH of the oxic water to a range of 2.5 to 7.5 and being capable of having bacterial species.

4. The system of claim 3, wherein the pretreatment system includes a lactam polymer composition contacting the oxic water, the lactam polymer composition being present in an amount adapted to destroy bacterial species capable of being associated with the transition metal ions.

5. The system of claim 3, wherein the pretreatment system includes a magnetic field source.

6. The system of claim 1, wherein the second chamber is separate from and is situated downstream of the first chamber.

7. The system of claim 1, wherein the transition metal ions comprise effluents selected from a group consisting of mine effluents, ship ballast waste, mercury waste in sediments, mercury waste in water, radioactive mercury leachates, water works effluents, and factory effluents.

8. The system of claim 1, wherein the filter is capable of collecting the transition metal-thiosulfate complex by sorption.

9. The system of claim 1, wherein the filter is selected from a sand and gravel filter, a sand filter, and a polymeric medium filter.

10. The system of claim 1, wherein the solid has a number-average particle size ranging from 2 μm to 40 μm.

11. A remediation system for use with an oxic water having transition metal ions, the system comprising:
    a pH adjustment system;
    a precipitation system fluidly communicating with the pH adjustment system and having a pH, the precipitation system having soluble thiosulfate ions present in an amount adapted to form a transition metal-thiosulfate complex capable of forming a solid;
    an introduction port fluidly communicating with the precipitation system;
    a polyvinyl pyrrolidone source communicating with the precipitation system through the introduction port and including a polyvinyl pyrrolidone composition present in an amount ranging from 0.1 wt. % to 5 wt. % of the oxic water in the precipitation system; and
    an immobilizer system situated downstream of the precipitation system and spaced apart from the pH adjustment system, the immobilizer system including a removable collection medium being capable of collecting the transition metal-thiosulfate complex and the solid generated in the precipitation system.

12. The system of claim 11, wherein the removable collection medium includes sand and gravel.

13. The system of claim 11, wherein the precipitation system further includes a composition selected from a group consisting of tetrathionate ions, and dithionite ions.

14. The system of claim 13, the precipitation system consists essentially of thiosulfate ions and tetrathionate ions capable of forming transition-metal complexes and solids.

15. The system of claim 11, wherein the pH in the precipitation system ranges from 4 to 7.

16. The system of claim 11, wherein the pH in the precipitation system ranges from 4.5 to 6.5.

17. A remediation system for use with an oxic water having transition metal ions, the system comprising:
    a first chamber defining a first cavity having a first inlet and a first outlet, the first cavity including the oxic water having dissolved ions of reduced species of chalcogenides, including at least one of thiosulfate ions and tetrathionate ions capable of binding with the transitional metal ions forming at least one of a transition metal-thiosulfate complex or a transition metal ion-tetrathionate complex, the complexes being capable of forming a solid, the solid having a number-average particle size ranging from 2 μm to 40 μm; and
    a second chamber, the chamber being in fluid communication with the first chamber, wherein the oxic water has a pH ranging from 4.5 to 6.5, the second chamber including a filter capable of collecting at least one of the transition metal-thiosulfate complex, the transition metal-tetrathionate complex, and the solid.

18. The system of claim 17, wherein the thiosulfate ions are present in an amount ranging from $1\times10^{-6}$ g S/L to $40\times10^{-6}$ g S/L.

19. The system of claim 17, wherein the filter is a sand and gravel filter.

20. The system of claim 17, wherein the system further includes a lactam polymer composition.

* * * * *